(No Model.)

E. A. HINCKLEY.
TELEPHONE.

No. 564,196.                    Patented July 21, 1896.

Witnesses:
John P. Bell
Ward Seckner

Inventor:
Edmund A. Hinckley

UNITED STATES PATENT OFFICE.

EDMUND A. HINCKLEY, OF OWEGO, NEW YORK.

TELEPHONE.

SPECIFICATION forming part of Letters Patent No. 564,196, dated July 21, 1896.

Application filed November 11, 1895. Serial No. 568,608. (No model.)

*To all whom it may concern:*

Be it known that I, EDMUND A. HINCKLEY, a citizen of the United States, residing at Owego, in the county of Tioga and State of New York, have invented a new and useful Improvement in Telephones, of which the following is a specification.

My invention relates to that class of telephones wherein balls of conducting material, preferably carbon, are supported on a back plate or other support and held by gravity in contact with the diaphragm, also of similar material, which acts upon the balls in such a manner as to vary the resistance of the circuit in unison with the sound-waves. Some of these telephones, as heretofore constructed, have been arranged to support the balls in cylindrical recesses in a back plate and let them fall by gravity against the diaphragm. By this mode of construction each ball is supported at two points only, one on the back plate and one on the diaphragm. In practice, one or more of the balls are generally found to be pivoted between these two points so delicately that speaking against the diaphragm will cause these balls to oscillate, causing loud singing noises in the receiver. These oscillations being renewed at each vibration of the diaphragm sometimes render conversation extremely difficult, if not impossible. Other telephones have been constructed holding the balls in the interstices of another set of balls behind the ones in contact with the diaphragm. While this has stopped the oscillations to some extent, the construction is not desirable, as the weight of both sets of balls is brought against the diaphragm.

The object of my invention is to overcome these objections so that telephones may be constructed in which the balls are securely held from oscillating or moving sideways, but still are left in such condition as to be easily influenced by vibrations of the diaphragm. I attain these conditions in a number of ways, but two of the most preferable are shown in the accompanying drawings, in which—

Figure 1:
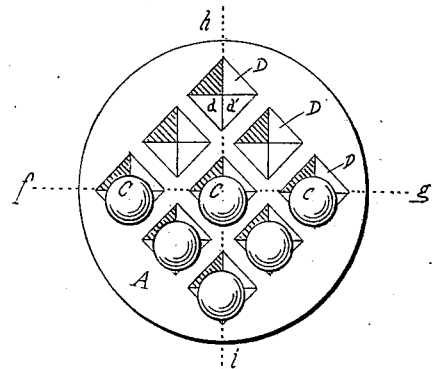
Figure 2:
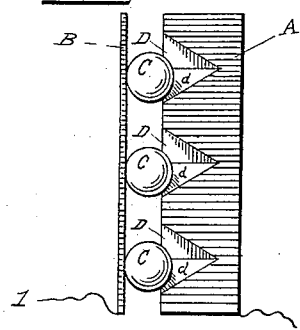
Figure 3:
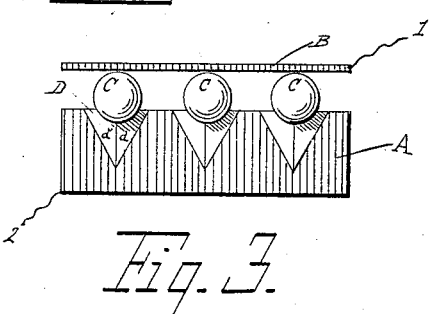

Figure 1 represents the back plate or ball-support with peculiar-shaped recesses for holding the balls, the upper balls being removed to more plainly show the construction. Fig. 2 is a sectional view on the line $h\,i$, Fig. 1. Fig. 3 is a section on the line $f\,g$, Fig. 1.

Similar letters refer to similar parts throughout the several views.

In Fig. 1 the back plate A is provided with a number of recesses having four sides each, the angles of which converge to a common point. Each recess is provided with a ball of suitable size. As before stated, three of the balls are removed. The surfaces $d$ and $d'$ support the ball on each side of its center, while the front is supported by the diaphragm, as shown in Figs. 2 and 3. The ball, therefore, is supported at three practically equidistant points, and is not liable to move unless one of the points moves. As this occurs only when the diaphragm vibrates, outside disturbances do not affect the efficiency of the telephone.

I am aware of the inventions of Bonta, Clamond, Drawbaugh, and others, wherein balls form the connections between a diaphragm and back-electrode.

The distinguishing characteristic of my invention is the means of preventing side motion or rolling of the balls, at the same time leaving them very sensitive to movements of the diaphragm. The circuit connections 1 2 are such that the current passes through the back plate, balls, and diaphragm. It is evident that I do not confine myself to the exact details shown and described, and the same may be modified without materially departing from the spirit and scope of my invention.

Having thus fully described my invention, what I claim as new, and desire to secure by Letters Patent, is—

1. In a telephone, the combination of a vertical diaphragm of semiconducting material, a back plate of like material provided with supports for a plurality of balls of like material, so arranged that each ball is supported on the back plate by two converging, plane surfaces $d$ and $d'$, each ball bridging the space between the back plate and diaphragm as shown and described.

2. In a telephone, a vertical diaphragm of carbon, a vertical back plate of like material provided with supports for a plurality of balls, all in combination with a plurality of carbon balls, said supports being arranged in such a manner that each ball is supported on the back plate by two converging, plane surfaces; said carbon balls bridging the space between the back plate and diaphragm.

EDMUND A. HINCKLEY.

Witnesses:
 WARD DECKER,
 S. S. WALLIS.